United States Patent [19]

Uchida et al.

[11] 3,937,732
[45] Feb. 10, 1976

[54] OXAMIDE BY HYDROLYSIS OF CYANOGEN

[75] Inventors: Shun-Ichi Uchida; Shigeru Ogawa, both of Tokyo, Japan

[73] Assignee: Sagami Chemical Research Center, Tokyo, Japan

[22] Filed: Apr. 9, 1974

[21] Appl. No.: 459,361

Related U.S. Application Data

[60] Division of Ser. No. 324,791, Jan. 18, 1973, abandoned, which is a continuation of Ser. No. 56,455, July 20, 1970, abandoned.

[30] Foreign Application Priority Data

July 21, 1969 Japan................................ 44-57071

[52] U.S. Cl.............. 260/561 R; 423/190; 423/423; 23/303
[51] Int. Cl.² ...................................... C07C 103/34
[58] Field of Search....... 23/272 AH, 267 A, 293 R, 23/270.5, 300 R, 303; 423/422, 423, 424, 190; 260/551 R, 551 C, 561 R

[56] References Cited
UNITED STATES PATENTS

| 2,109,941 | 3/1938 | D'Alelio............................ 260/561 R |
| 2,555,340 | 6/1951 | Hopper............................. 23/272 AH |
| 2,737,440 | 3/1956 | Roberts............................... 473/423 |
| 3,390,402 | 6/1968 | Goerg................................ 23/272 AH |

*Primary Examiner*—Jack Sofer
*Assistant Examiner*—S. J. Emery
*Attorney, Agent, or Firm*—Wenderoth, Lind & Ponack

[57] ABSTRACT

A method for collecting a solid product from a liquid phase or liquid phase-gaseous phase feed stock. A solid forming zone is provided for accommodating the liquid phase or liquid phase-gaseous phase feed stock having a density greater than that of a liquid to be fed. A precipitation zone is provided at its lower portion with a feed port for feeding the liquid and a discharge port for taking out the solid product and communicating with the solid forming zone at its upper portion. The precipitation zone is provided therein with stirring means by which the solid product and liquid are contacted with each other countercurrently. The solid product is washed with the liquid and the density relation between the liquid phase and the liquid is reversed as the latter moves upwardly in the precipitation zone. Solid oxamide may be produced from cyanogen.

1 Claim, 3 Drawing Figures

SHUN-ICHI UCHIDA and
SHIGERU OGAWA, Inventors

By *Wenderoth, Lind & Ponack*
Attorneys

OXAMIDE BY HYDROLYSIS OF CYANOGEN

This is a division of application Ser. No. 324,791, filed Jan. 18, 1973, now abandoned, which in turn is a continuation of application Serial No. 56,455, filed July 20, 1970, now abandoned.

BACKGROUND OF THE INVENTION

The present invention relates to a process for collecting a solid product from a liquid phase or liquid phase-gaseous phase feed stock, and more specifically to a process such that a solid product produced from a liquid phase or liquid phase-gaseous phase mixture having a density greater than a liquid to be supplied is continuously contacted with the liquid countercurrently, and the density relation between the mixture and the liquid is reversed as the latter ascends.

A reaction to produce a reaction product from a liquid phase or liquid phase-gaseous phase reaction system has been well known. As an example, there can be named a reaction to form solid oxamide by blowing cyanogen gas into an aqueous solution of mineral acid and hydrating the same. In this case, it becomes necessary, for obtaining the oxamide as the final product, to remove the acid attached to the oxamide by washing it away with water. A process employed heretofore for such reaction has the disadvantage that not only is a specific washing water required for the washing of oxamide, but also a large quantity of dilute waste acid is produced as by-product, the disposition of which calls for a special operation.

Thus, in an inconsistent reaction wherein a solid product is collected from a liquid phase or liquid phase-gaseous phase reaction system, it is not necessarily easy to carry out the reaction on a continuous basis and to continuously remove the solid product from the reaction system. Moreover, it is difficult to remove the solid product in a pure form.

An operation of collecting a solute in the form of solid from a solution by concentrating the solution has also commonly been practiced industrially. According to the conventional operation, however, it has been difficult to remove a substance in such a solution continuously and yet in a washed pure form.

An object of the present invention is to provide a process by which a solid product can be taken out from a liquid phase or liquid phase-gaseous phase feed stock, continuously and yet in a purified form.

Another practical object of the invention is to provide a continuously hydrolyzing process for cyano compounds, such as cyanogen, by which the hydrolysis of a cyano compound, such as cyanogen, whose hyrolysis product is substantially insolutible in water, and the washing of the hydrolysis product with water, can be effected concurrently, and which does not call for a specific washing water for the washing of the hydrolysis product.

Still another practical object of the invention is to provide a process by which a solid substance disolved in a solution, such as brine, can be taken out thereform continuously and yet in a relatiely pure form, without requiring a specific washing liquid.

According to the present invention there is provided a process for collecting a solid product from a liquid phase or liquid phase-gaseous phase feed stock, wherein there is provided a solid forming zone for accommodating a liquid phase or liquid phase-gaseous phase mixture having a density greater than that of a liquid to be fed and a precipitation zone having at its lower portion a feed port for feeding the liquid and a discharge port for discharging the solid reaction product communicating with the solid forming zone at its upper portion, the precipitation zone being provided therein with stirring means by which the solid product and the liquid are caused to contact each other countercurrently, whereby the former is washed with the latter and the density relation between the mixture and the liquid is reversed as the latter moves upwardly.

BRIEF DESCRIPTION OF THE DRAWINGS

The present invention will be described in further detail hereunder with reference to the accompanying drawing, in which.

DETAILED DESCRIPTION OF THE INVENTION

Figures 1, 2, 3:
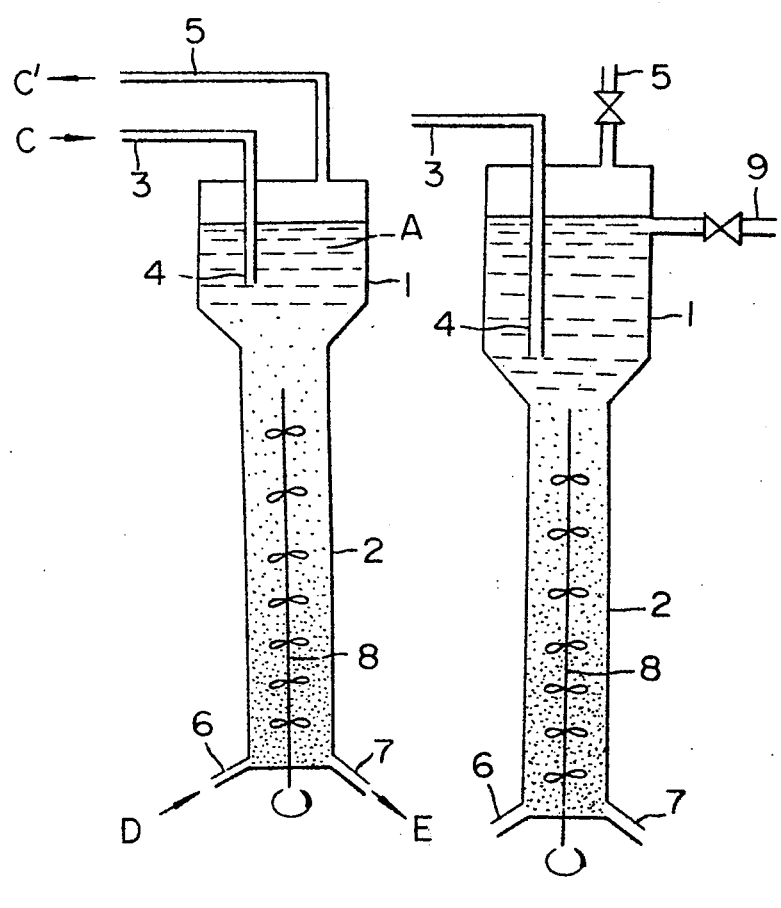
FIGS. 1 through 3 are cross-sectional views diagrammatically showing different embodiments of apparatus for performing present the invention.

Referring first to FIG. 1, there is shown an embodiment of an apparatus for carrying out the invention which can be applied to the hydrolysis, for example, of cyanogen. In FIG. 1, reference numeral 1 designates a reaction zone, 2 a hydrolysis product precipitation zone, 3 an inlet conduit for cyanogen, 4 a cyanogen injecting end of conduit 3, 5 a gas releasing conduit, 6 a feed port for water, 7 a discharge port for oxamide which is the hydrolysis product, and a stirring means.

In the reaction zone 1 is stored a liquid, such as a mineral acid, containing a hydrolyzing agent, and the material cyanogen is introduced into this liquid phase, preferably in the form of gas, through the conduit 3 and the blowing end 4 of such conduit. The cyanogen is hydrolyzed in the liquid phase and the hydrolysis product (oxamide) formed precipitates in the precipitation zone 2 communicating with reaction zone 1, since it is substantially insoluble in the liquid. The unreacted cyanogen is released through the gas releasing conduit 5 as indicated by C' and may be recycled to the conduit 3 through a collector and displacing means as required.

The stirring means 8 is provided in the precipitation zone 2 extending in the axial direction thereof, and the feed port 6 for a liquid D and the discharge port 7 for the hydrolysis product E are provided at the lower portion of precipitation zone 2. The liquid (water in this case) fed through the feed port 6 flows upwardly in the precipitation zone while contacting the hydrolysis product countercurrently which is descending in the same zone, and reaches the reaction zone 1. On the other hand, the hydrolysis product E falls in the precipitation zone 2 while being washed with the countercurrent of the liquid, and removed from the reaction system in the form of cake or slurry through the discharge port 7.

In this case, the liquid introduced into the precipitation zone from the bottom thereof is lower in density than the liquid phase (containing the hydrolyzing agent) in the reaction zone above the precipitation zone. However, by the function of the stirring means provided axially in the precipitation zone, the density relation between the liquid and the reaction system is reversed without resulting in mixing of both, or a phenomenon occurs in which the density of the liquid becomes progressively greater as the liquid flows upwardly in the precipitation zone. Thus, accordance with the present invention, the quantity and density of the hydrolyzing agent in the reaction zone are maintained substantially constant and the solid hydrolysis product falls in the precipitation zone without being accompanied by the hydrolyzing agent and hence the hyrolysis product can be obtained in a substantially purified form.

The quantity of the liquid (water in this case) fed through the feed port 6, may be the sum of the quantity of the liquid required for the hydrolysis of the cyanogen and the quantity of the same discharged to the outside along with the hydrolysis product, and a quantity of water for washing the hyrolysis product is not particularily necessary. On the other hand, the hydrolysis product removed from the discharge port 7 is practically free from the hydrolyzing agent, such as a mineral acid, as a result of being washed with water. Therefore, it can be used as a reaction product, without going through the additional step of washing.

The stirring means provided in the precipitation zone is preferably of the type which comprises a plurality of equally spaced impeller vanes fixed to a vertical shaft. This stirring means may be provided coaxially with the axis of the precipitation zone. The intensity of stirring by the stirring means must be relatively mild so as to produce a close contact between the hydrolysis product and the liquid, but to allow the solid hydrolysis product to precipitate constantly. The introduction of water into the precipitation zone can be effected by any means and, for instance, a distributor may be used which is used for introducing a liquid into a solid bed. It should be understood, however, that the use of the distributor is not mandatory. The hydrolysis product can be taken out in the form of a slurry directly through the discharge conduit, either continuously or intermittently. Discharge means, such as a screw, may be provided in the discharge conduit 7 to facilitate the removal of the hydrolysis product.

As the hydrolyzing agent usuable in the abovedescribed reaction of hydrolyzing cyanogen into oxamide, mineral acids such as sulfuric acid, hydrochloric acid, etc. may be used. Hydrochloric acid is used in the form of an aqueous solution at a concentration of 10 – 36 % and sulfuric acid at a concentration of 30 – 98 %. For the purpose of promoting the hydrolysis of the cyanogen, a promotor may be used in combination with the mineral acid. For instance, a combination of sulfuric acid and mercury oxide can be charged in the reaction zone. The acid which is particularly advantageously used in the hydrolysis of cyanogen, is hydrochloric acid. No specific restrictions are imposed on the reaction conditions. For instance, the reaction in the reaction zone may be carried out in the temperature range from 10°C. to the boiling point of the reaction system, under normal pressure. If a pressure-resistant pump is used for introducing cyanogen, the reaction may be carried out under pressure or reduced pressure.

The important advantage which can be achieved by using the present invention for the hydrolysis of cyanogen, is that the washing of the reaction product, i.e. oxamide, and the hydrolysis of a cyano compound can be effected only with a quantity of water which is the sum of the quantity required for the hydrolysis of the compound and the quantity which is removed from the reaction system along with the hydrolysis product. It will, therefore, be seen that the concentration of the hydrolyzing agent in the reaction zone can be maintained constant over an extended period. Practically, the quantity of water to be fed is generally from 1.0 – 1.5 times, particularly from 1.00 – 1.02 times, the equivalent of the cyanaogen, though such quantity is variable depending upon the water content in the slurry of the reaction product. The height of the precipitation zone may be determined through experiment so that the aforesaid reversal of density relation may be realized and the oxamide, removed from the bottom of the precipitation zone, is substantially free from the hydrolyzing agent, through such height is variable depending upon the particle size of the oxamide formed and the quantity of the same formed per unit cross-sectional area of the precipitation zone.

A practical example of the apparatus of this invention being applied to the hydrolysis of cyanogen, will be illustrated hereunder:

EXAMPLE

Using an apparatus of FIG. 1 having the below-depicted dimensions, a hydrolysis of cyanogen into oxamide was conducted.

| Reaction zone | Diameter | 130 mm |
|---|---|---|
| | Inside volume | 6 l |
| Precipitation zone | Diameter | 70 mm |
| | Height | 2000 mm |
| Stirrer | Impeller vanes fixed to a vertical shaft at an interval of 35 mm, and rotated at 14 r.p.m. | |

Two (2) l of 36 % hydrochloric acid was charged in the reaction apparatus and water was fed into the precipitation zone from the bottom thereof at the rate of 157 g/hr through a distributor. On the other hand, cyanogen was blown into the hydrochloric acid at normal temperature at the rate of 94 g/hr. The oxamide formed was collected in the form of a slurry. The slurry was composed of

| oxamide | 158 g/hr |
|---|---|
| water | 92 g/hr | and contained only 0.01 % of hydrochloric acid therein. The hydrochloric acid concentration in the reaction zone was measured 240 hours after initiation of the reaction, and was found to be the same as that immediately after initiation of the reaction.

Although the apparatus of the present invention, shown in FIG. 1, has been described with reference to the case wherein it is applied to the hydrolysis of cyanogen into oxamide, it is to be understood that the apparatus can be widely used, with only a slight modification thereto, for the hyrolysis of may other compounds, e.g. organic cyano compounds such as adiponitrile, whose hydrolysis products are substantially insoluble in water. Thus, by employing the present process, an adipoamide crystal, for example, can be produced from adiponitrile continuously in a pure form.

FIG. 2 shows another embodiment of an apparatus for carrying out the invention which can be used for the production of sodium bicarbonate by the ammonia soda process. Referring to FIG. 2, reference numeral 1 designates a reaction zone, 2 a precipitation zone for the sodium bicarbonate formed, 3 an inlet conduit for carbon dioxide, 4 an injecting end of inlet conduit 3, 5 a gas releasing conduit, 6 a feed port for ammoniacal brine substantially saturated with sodium bicarbonate, 7 a discharge port for sodium bicarbonate, 8 a stirring means and 9 a discharge port for aqueous ammonium chloride. This apparatus is similar to that of FIG. 1, except that the liquid discharge port is connected to the reaction zone.

In the reaction zone 1, the ammoniacal brine fed into the apparatus from the bottom 6 of the precipitation zone 2, and the carbon dioxide blown into the reaction system from the injecting end 4 of the conduit 3, react with each other as represented by the reaction formula $$NaCl + NH_3 + CO_2 + H_2O = NaHCO_3 + NH_4Cl$$

to form sodium bicarbonate and ammonium chloride. The sodium bicarbonate thus formed falls in the precipitation zone 2 having the stirring means 8 provided therein, and is discharged to the outside through the discharge port 7 after having been washed with the countercurrent of the ammoniacal brine fed through the feed port 6. On the other hand, the ammoniacal brine fed through the feed port 6 flows in the precipitation zone while contacting the sodium bicarbonate countercurrently, and reaches the reaction zone 1.

In the reaction described above, water is used for the formation of sodium bicarbonate and ammonium chloride remains in the liquid phase, so that the density of the liquid phase is greater than that of the ammoniacal brine fed from the bottom of the precipitation zone. However, by the stirring effect of the stirring means provided axially in the precipitation zone, reversal of density occurs or a phenomenon occurs wherein the density becomes progressively large as the ammoniacal brine flows upwardly in the precipitation zone, as in the preceding embodiment, without resulting in reverse mixing.

The solution accumulating in the reaction zone 1 with the passage of time, which consists mainly of ammonium chloride, is allowed to continuously overflow through the discharge port 9 or is removed from the apparatus either continuously or intermittently by suitably opening a valve provided in the discharge port. The unreacted waste gas can be discharged to the outside through the gas releasing conduit, upon opening a valve provided in the conduit. Although, in the arrangement of FIG. 2, the ammoniacal brine is fed through the feed port 6, it is also possible to feed a brine, substantially saturated with sodium bicarbonate, only through the feed port 6 and ammonia from an optional point intermediate of the precipitation zone.

In the process of the invention described with respect to FIG. 2, it is possible to produce a relatively pure sodium bicarbonate on a continuous basis by a reaction apparatus which is extremely small as compared with that used hitherto in the ammonia soda process.

The process of the type now being discussed may also be applied to the production of adipic acid from adiponitrile. In this case, adipic acid can be produced by the same operation as described above, except that the adiponitrile is fed into the apparatus from an intermediate point of the precipitation zone, water from the feed port 6 and a mineral acid solution from the inlet conduit 3, and the ammonium acid produced as by-product is removed from the reaction system from the discharge port 9.

FIG. 3 shows still another embodiment of an apparatus for carrying out the invention, which can be used for separating, for example a common salt crystal from a brine. In FIG. 3, reference numeral 1 designates a solid forming zone, 2 a solid product precipitation zone, 6 a feed port for the brine, 7 a discharge port for the common salt crystal, 8 stirring means, 5 and aqueous vapor releasing port and 10 heating means.

The brine, e.g. a concentrated and purified sea water, fed through the feed port 6 flows in the precipitation zone 2 upwardly and reaches the solid forming zone 1 wherein it is heated and concentrated. The common salt crystal formed in the solid forming zone 1 falls in the precipitation zone 2, is washed with the counterflow of the brine fed from the bottom of the precipitation zone by contact therewith and is discharged to the outside through the discharge port 7 in the form of a slurry or cake.

The heating means 10 may be provided inside or outside of the solid forming zone. The pressure in the solid forming zone may be the atmospheric pressure or a subatmospheric pressure. The aqueous vapor released through the aqueous vapor releasing port 5 may be used as a preheating source for the brine or as a heating source for others.

Due to concentration of the brine, the density in the solid forming zone is greater than the density of the material brine, but reverse mixing can be avoided also in this case, by providing the stirring means axially in the precipitation zone. Moreover, the quantity of the brine required for the separation can be extremely small as compared with the quantity of the common salt taken out from the apparatus, and the precipitation of fine particles can be prevented.

Although the process described with reference to FIG. 3 has been described with reference to the case of separating common salt from a brine, it is to be understood that this type of process can be effectively used for separating and recovering a solute from a solution thereof.

It should be understood that, although the present invention has been described and illustrated herein by way of example with reference to hydrolyzing cyanogen, forming sodium bicarbonate by the ammonia soda process and separating common salt crystal from a brine, the process of the instant invention can be widely used in an inconsistent reaction of forming a solid reaction product from a liquid phase or liquid phase-gaseous phase reaction system and in the operation of precipitating a solid from a liquid phase or liquid phase-gaseous phase feed stock.

It will be obvious to those skilled in the art that, in the present invention, not only a feed stock consisting of a homogeneous liquid phase but also a feed stock consisting of two immiscible liquid phases, e.g. an emulsion or suspension, can be used as the liquid phase feed stock.

According to the present invention, there is an industrial advantage in that it is possible not only to take out a solid product continuously and in a substantially purified form without using a special washing liquid, but also the effect such operation with an extremely compact apparatus without impairing the generic characteristic of a precipitation layer, i.e. the continuous distribution of a coarse crystal at the lower portion of the layer and a fine crystal at the upper portion of the same.

We claim:

1. A process for the continuous production of oxamide by hydrolysis of cyanogen, said process comprising:
providing a reaction zone having therein an aqueous solution containing mineral acid as a hydrolizing agent;

continuously feeding into said reaction zone gaseous cyanogen and contacting said gaseous cyanogen with said aqueous solution to form solid precipitates of oxamide;

passing said precipitates of oxamide formed in said reaction zone down into an through a precipitation zone, the precipitation zone being in contiguous communication with the bottom of said reaction zone and being equipped with a stirrer means arranged coaxially only in said precipitation zone;

continuously feeding water into the bottom of said precipitation zone and passing it upwardly therethrough into said reaction zone and washing said solid precipitates of oxamide by said water in said precipitation zone;

continuously removing said solid precipitates of oxamide washed by said water as cake or slurry from the bottom of said precipitation zone; and the amount of water fed into the bottom of said precipitation zone being the sum of the amount of water consumed in the reaction of hydrolysis of cyanogen in said reaction zone and the amount of water accompanied with the oxamide taken out as cake or slurry.

* * * * *